US012174570B2

(12) United States Patent
Souda et al.

(10) Patent No.: US 12,174,570 B2

(45) Date of Patent: Dec. 24, 2024

(54) FIXING UNIT

(71) Applicant: BROTHER KOGYO KABUSHIKI KAISHA, Nagoya (JP)

(72) Inventors: Makoto Souda, Nagoya (JP); Yuichi Ikeno, Maibara (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 35 days.

(21) Appl. No.: 18/160,733

(22) Filed: Jan. 27, 2023

(65) Prior Publication Data

US 2023/0244165 A1 Aug. 3, 2023

(30) Foreign Application Priority Data

Jan. 31, 2022 (JP) ................................ 2022-013122

(51) Int. Cl.
*G03G 15/20* (2006.01)

(52) U.S. Cl.
CPC ....... *G03G 15/2053* (2013.01); *G03G 15/205* (2013.01); *G03G 2215/2038* (2013.01)

(58) Field of Classification Search
CPC ........... G03G 15/2017; G03G 15/2053; G03G 2215/2003
See application file for complete search history.

(56) References Cited

U.S. PATENT DOCUMENTS

2015/0227091 A1 8/2015 Ando et al.
2016/0098001 A1* 4/2016 Ogawa .............. G03G 15/2053 399/338
2019/0113868 A1* 4/2019 Akizuki ............ G03G 15/2064
2021/0132527 A1* 5/2021 Kikuchi ............ G03G 15/2053

FOREIGN PATENT DOCUMENTS

JP 2017-142428 A 8/2017
JP 2017-199024 A 11/2017
JP 2018-136392 A 8/2018

* cited by examiner

*Primary Examiner* — Thomas S Giampaolo, II
(74) *Attorney, Agent, or Firm* — Merchant & Gould P.C.

(57) ABSTRACT

A fixing unit includes a heater including a substrate and a resistance heating element disposed on the substrate, an endless belt configured to move about the heater and having an inner peripheral surface in contact with the heater, and a holder holding the heater in a hole of the holder, a metal sheet in contact with the substrate and a temperature sensor configured to detect a temperature of the heater. The temperature sensor is in contact with the metal sheet through the hole, and an end portion of the metal sheet in a lateral direction of the substrate is inserted into the hole so that the metal sheet is positioned with respect to the heater in the lateral direction.

16 Claims, 10 Drawing Sheets

FIXING UNIT

REFERENCE TO RELATED APPLICATIONS

This application claims priority from Japanese Patent Application No. 2022-013122 filed on Jan. 31, 2022. The entire content of the priority application is incorporated herein by reference.

BACKGROUND ART

In the field of an image forming apparatus such as an electrophotographic printer, an image forming apparatus including a fixing unit that fixes a developer image by heating a sheet which is an image forming target is known. Such a fixing unit generally includes a heater including a resistance heating element, and a temperature sensor that detects a temperature of the heater. In the fixing unit, a fixing temperature obtained by the heater is controlled based on a detection result of the temperature sensor. It has been proposed that in a fixing unit in related art, a graphite sheet, which is a sheet-shaped thermally conductive member, is provided between a heater and a temperature sensor, and the graphite sheet is pressed toward the heater by a spring via the temperature sensor, so that the heater is brought into close contact with the graphite sheet.

DESCRIPTION

In the fixing unit in the related art, temperature detection performed by the temperature sensor may not be stable. Specifically, in the fixing unit in the related art, a pressing force (biasing force) of the spring applied to the graphite sheet may change instantaneously or over time, and a displacement easily occurs in relative position of the temperature sensor with respect to the graphite sheet.

A fixing unit having a metal sheet of the present disclosure contributes reduction of displacement in relative position of a temperature sensor with respect to a sheet in contact with the temperature sensor.

According to an aspect of the present disclosure, a fixing unit includes a heater including a substrate and a resistance heating element disposed on the substrate, an endless belt configured to move about the heater and having an inner peripheral surface in contact with the heater, and a holder holding the heater in a hole of the holder, a metal sheet in contact with the substrate and a temperature sensor configured to detect a temperature of the heater. The temperature sensor is in contact with the metal sheet through the hole, and an end portion of the metal sheet in a lateral direction of the substrate is inserted into the hole so that the metal sheet is positioned with respect to the heater in the lateral direction.

According to the above configuration, the metal sheet is positioned with respect to the heater and contributes to reduce a positional deviation of the metal sheet with respect to the temperature sensor.

FIG. 1 is a diagram illustrating a schematic configuration of an image forming apparatus.

FIG. 2 includes (A) which is a plan view showing a heater of a heating unit included in a fixing unit, and (B) which is a plan view showing a first temperature sensor, a second temperature sensor, and a power supply cutoff member of the heating unit.

FIG. 3 includes (A) which is a perspective view showing the first temperature sensor and the second temperature sensor, and (B) which is a perspective view showing the power supply cutoff member.

Figure 10:
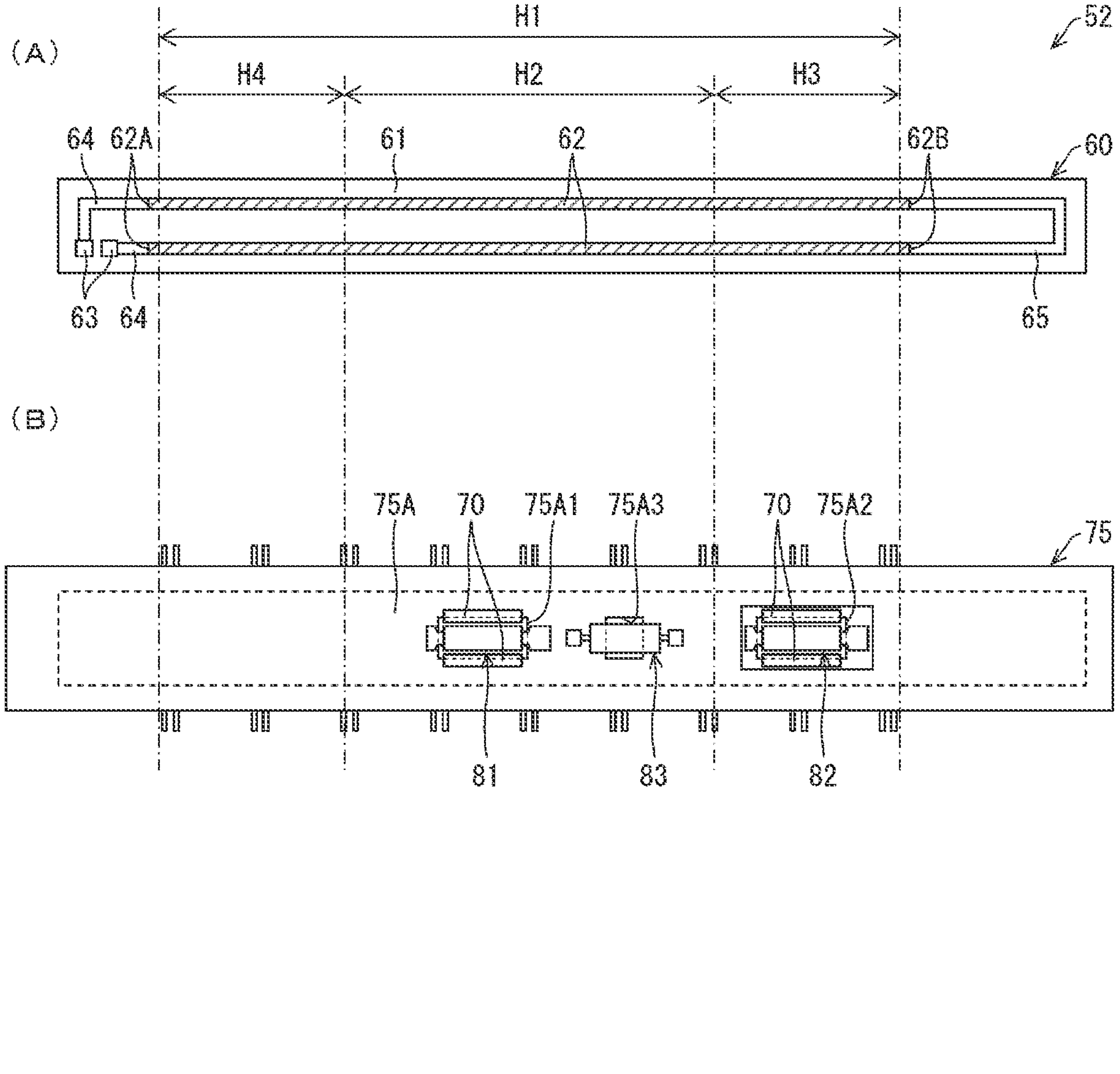

FIG. 10 includes (A) which is a plan view showing the heater of the heating unit included in the fixing unit, and (B) which is a plan view showing the first temperature sensor, the second temperature sensor, and the power supply cutoff member of the heating unit.

Figure 11:
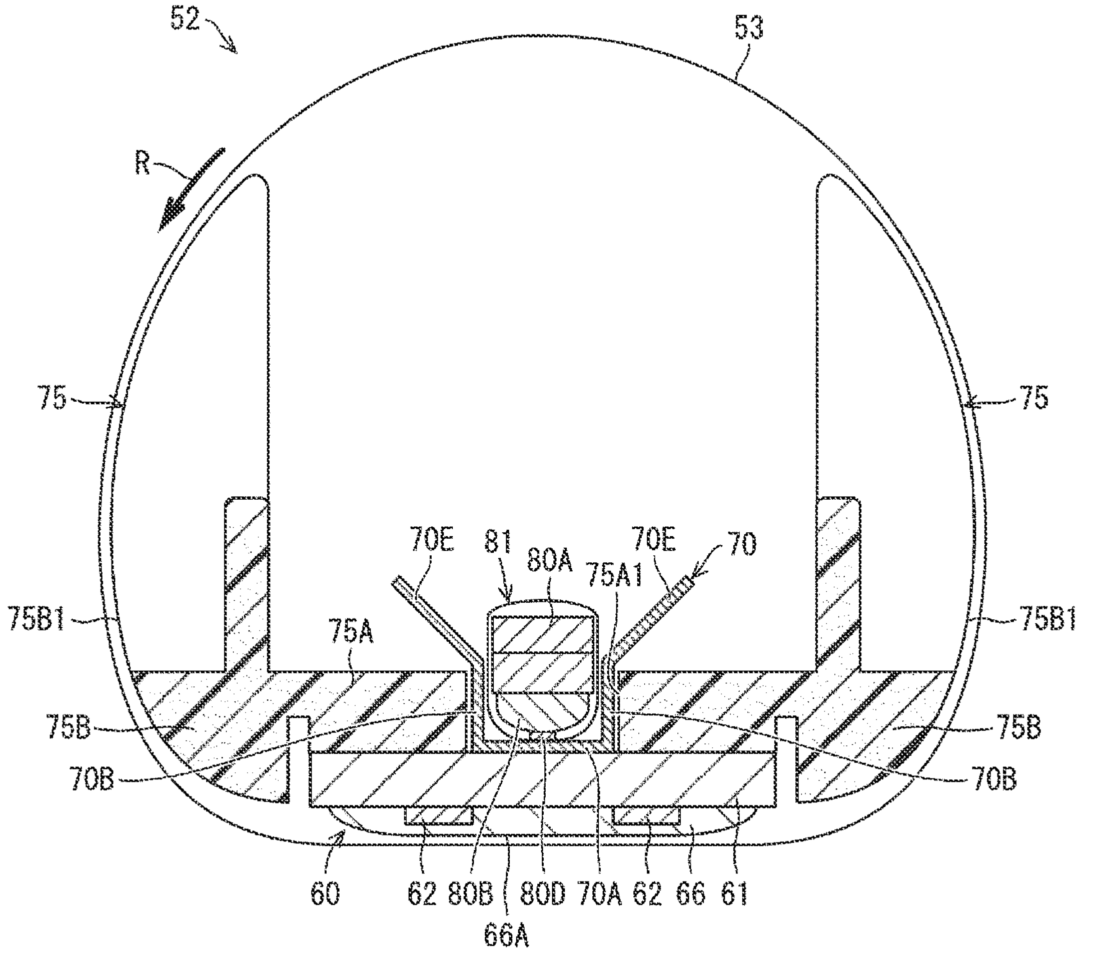

FIG. 11 is a cross-sectional view showing the first temperature sensor and the metal sheet of the heating unit.

FIRST EMBODIMENT

Hereinafter, a first embodiment of the present disclosure will be described with reference to FIGS. 1 to 6. In the present embodiment, a laser printer that forms an image on a sheet S1 by using toner will be described as an example of an image forming apparatus 1.

[Configuration of Image Forming Apparatus 1]

Figure 1:
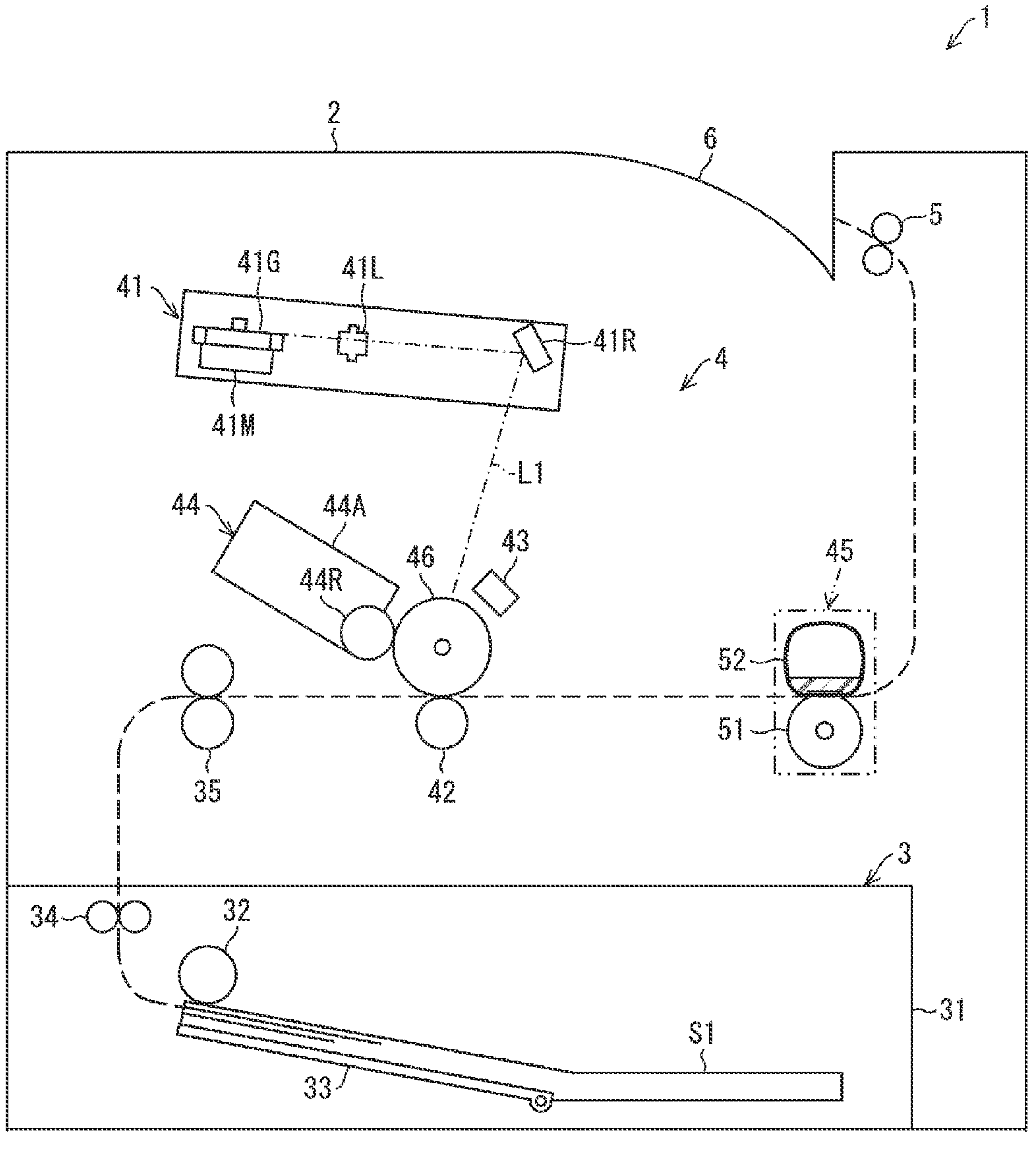

FIG. 1 is a diagram illustrating a schematic configuration of the image forming apparatus 1 according to the first embodiment of the present disclosure. In the following description, a monochrome printer that performs an image forming process for a monochrome image is illustrated as an example of the image forming apparatus 1, but the present embodiment is not limited thereto, and the image forming apparatus 1 may be, for example, a color printer that performs an image forming process for a full-color image.

As shown in FIG. 1, the image forming apparatus 1 includes a housing 2, a sheet feeding unit 3, an image forming unit 4, discharge rollers 5, and a discharge tray 6. As shown in FIG. 1, the housing 2 constitutes an outer container of the image forming apparatus 1, and accommodates main components of the image forming apparatus 1 therein.

As shown in FIG. 1, the sheet feeding unit 3 feeds the sheet S1. The sheet feeding unit 3 includes a sheet feeding tray 31, a feeding roller 32, a pressing plate 33, conveying rollers 34, and registration rollers 35. The sheet feeding tray 31 is a box-shaped member whose upper surface is open, and accommodates a given amount of sheets S1 therein. The sheet S1 is a recording medium on which an image forming process is to be performed, and is paper, plastic, or the like.

The feeding roller 32 feeds the sheet S1 accommodated in the sheet feeding tray 31. That is, when the sheet S1 is fed, the sheet S1 on the sheet feeding tray 31 is moved to the feeding roller 32 by the pressing plate 33, and is fed to the conveying rollers 34 as the feeding roller 32 rotates. The conveying rollers 34 convey the sheet S1 toward the registration rollers 35. The registration rollers 35 align a position of a leading end of the sheet S1 and then convey the sheet S1 toward the image forming unit 4.

The image forming unit 4 forms an image by performing an image forming process on the sheet S1 fed by the sheet feeding unit 3. As shown in FIG. 1, the image forming unit 4 includes an exposure unit 41, a transfer unit 42, a charger 43, a developing unit 44, a fixing unit 45 according to the present disclosure, and a photosensitive drum 46. The exposure unit 41 includes a laser light source (not shown), a polygon mirror 41G, a scanning lens 41L, a polygon motor 41M, and a reflecting mirror 41R.

The polygon mirror 41G is a rotary polygon mirror in which side surfaces of a regular hexagonal prism are used as six reflection surfaces. The polygon mirror 41G deflects, in a direction toward the photosensitive drum 46, a light beam L1 emitted from the laser light source. The polygon motor 41M is driven by a motor driver (not shown), thereby rotatably driving the polygon mirror 41G.

The exposure unit 41 deflects the light beam L1 by the polygon mirror 41G so as to emit the light beam L1 from the polygon mirror 41G to a surface of the photosensitive drum 46 through the scanning lens 41L and the reflecting mirror 41R. The exposure unit 41 exposes the photosensitive drum 46 by scanning the surface of the photosensitive drum 46 with the light beam L1. As a result, an electrostatic latent image constituting a toner image to be described later is formed on the photosensitive drum 46. The polygon motor 41M is, for example, a brushless DC motor.

The transfer unit 42 includes a transfer roller with the sheet S1 sandwiched between the photosensitive drum 46 and the transfer roller, and transfers the toner image from the photosensitive drum 46 to the sheet S1. The charger 43 includes, for example, a scorotron-type charger including a charging wire (not shown) and a grid portion. In the charger 43, a charging voltage is applied to the charging wire and a grid voltage is applied to the grid portion by a high-voltage generation circuit (not shown), so that corona discharge occurs and the surface of the photosensitive drum 46 is uniformly charged. The developing unit 44 includes a developing roller 44R and a toner cartridge 44A in which a developer such as toner is accommodated.

Alternatively to the above description, for example, the transfer unit 42 may include a transfer belt instead of the transfer roller. For example, the charger 43 may include a charging roller instead of the scorotron-type charger.

In the image forming unit 4, the surface of the photosensitive drum 46 is uniformly charged by the charger 43, and an electrostatic latent image based on print data is then formed on the surface of the photosensitive drum 46 by the light beam L1 from the exposure unit 41. The developing roller 44R supplies the toner from an inside of the toner cartridge 44A to the surface of the photosensitive drum 46 on which the electrostatic latent image is formed. As a result, the electrostatic latent image is visualized and the toner image is formed on the surface of the photosensitive drum 46. Thereafter, the sheet S1 fed from the sheet feeding unit 3 is conveyed to a transfer position between the photosensitive drum 46 and the transfer unit 42, so that the toner image formed on the surface of the photosensitive drum 46 is transferred onto the sheet S1.

The sheet S1 onto which the toner image is transferred is conveyed to the fixing unit 45 by the photosensitive drum 46 and the transfer unit 42. The fixing unit 45 fixes the toner image formed on the sheet S1. Specifically, the fixing unit 45 thermally fixes, using heat generated by a heater 60, the toner image on the sheet S1 conveyed from the photosensitive drum 46 and the transfer unit 42. The sheet S1 on which the toner image is thermally fixed is discharged onto the discharge tray 6 by the discharge rollers 5.

The fixing unit 45 includes a pressing roller 51 that presses the sheet S1 on which the toner image is formed, and a heating unit 52 that is in contact with the sheet S1 and heats the sheet S1. Among the pressing roller 51 and the heating unit 52, one is pressed toward the other by a pressing portion (not shown). In the fixing unit 45, the pressing portion is controlled in accordance with an instruction from a controller (not shown), so that a fixing operation of the toner image on the sheet S1 is performed in a state where a given pressure is applied between the pressing roller 51 and the heating unit 52.

In FIG. 1, in accordance with an instruction from the controller, the pressing roller 51 is driven to rotate clockwise. That is, the pressing roller 51 rotates in a state where the sheet S1 to be conveyed to a discharge tray 6 side is sandwiched between the pressing roller 51 and a belt 53 to be described later which is provided in the heating unit 52. As a result, due to frictional forces between the pressing roller 51, and the belt 53 and the sheet S1, the belt 53 is driven to rotate in a given rotation direction as indicated by R in FIG. 5 to be described below. As a result, in the fixing unit 45, the sheet S1 onto which the toner image is transferred is conveyed between the pressing roller 51 and the heating unit 52, so that the toner image is thermally fixed on the sheet S1.

[Configuration of Heating Unit 52]

Figure 2:
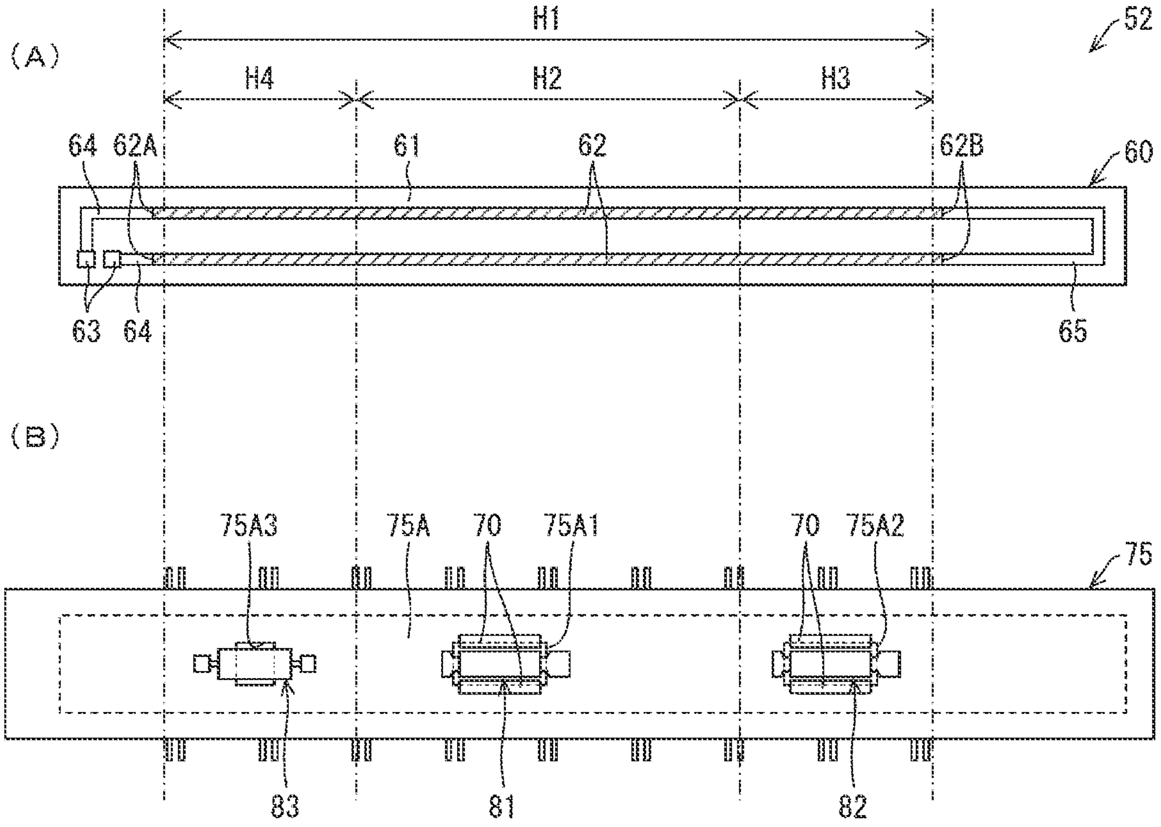
Figure 3:
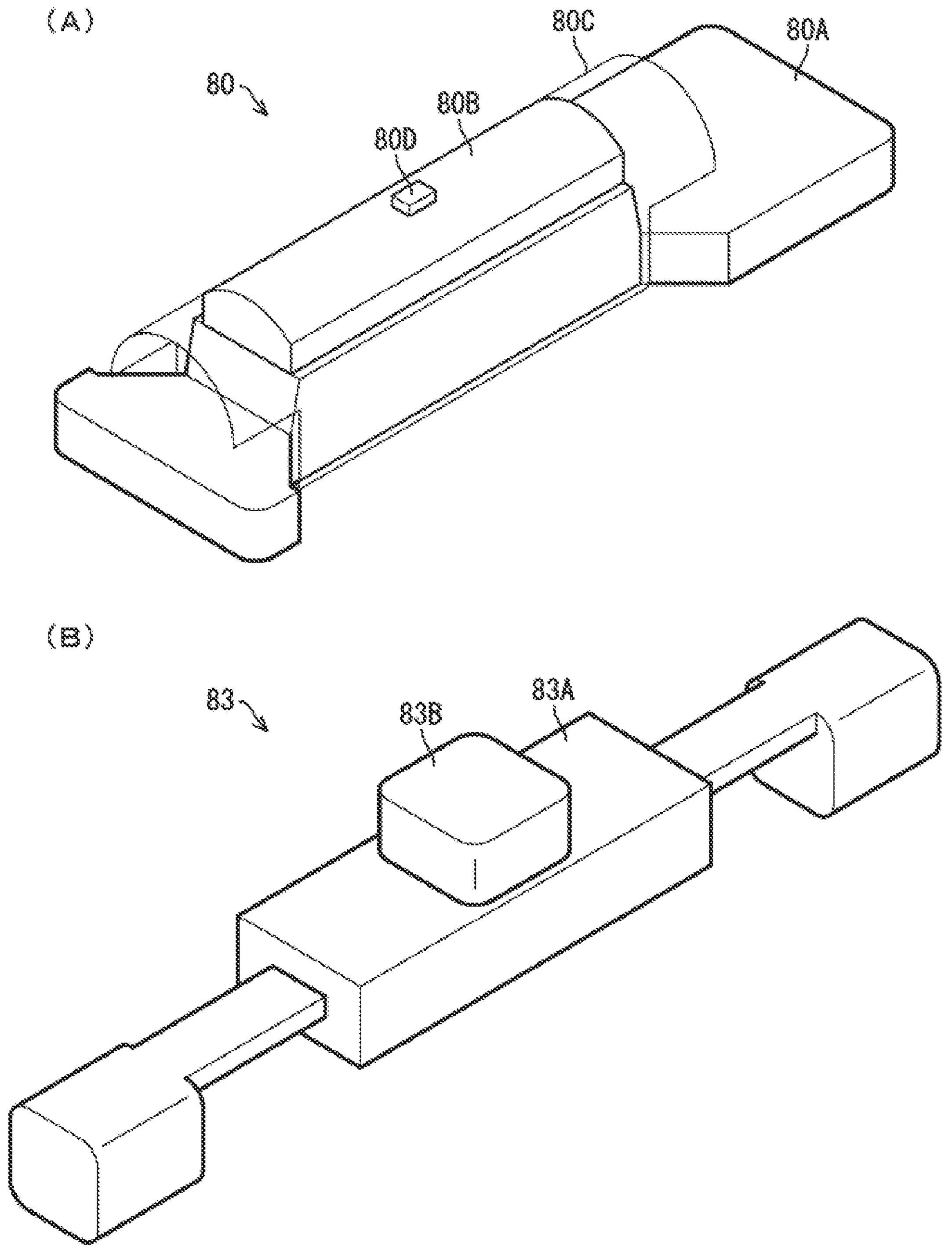
Figure 4:
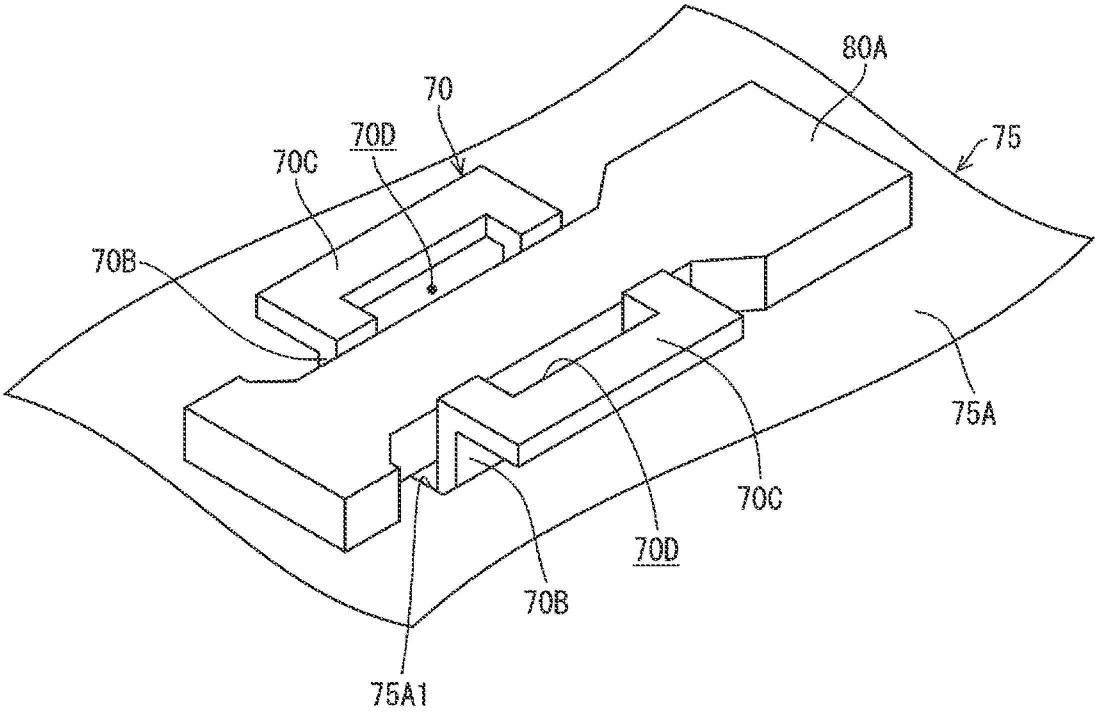
FIG. 4 is a schematic view illustrating a relationship between a metal sheet and a temperature sensor in a holder shown in FIG. 2.
Figure 5:
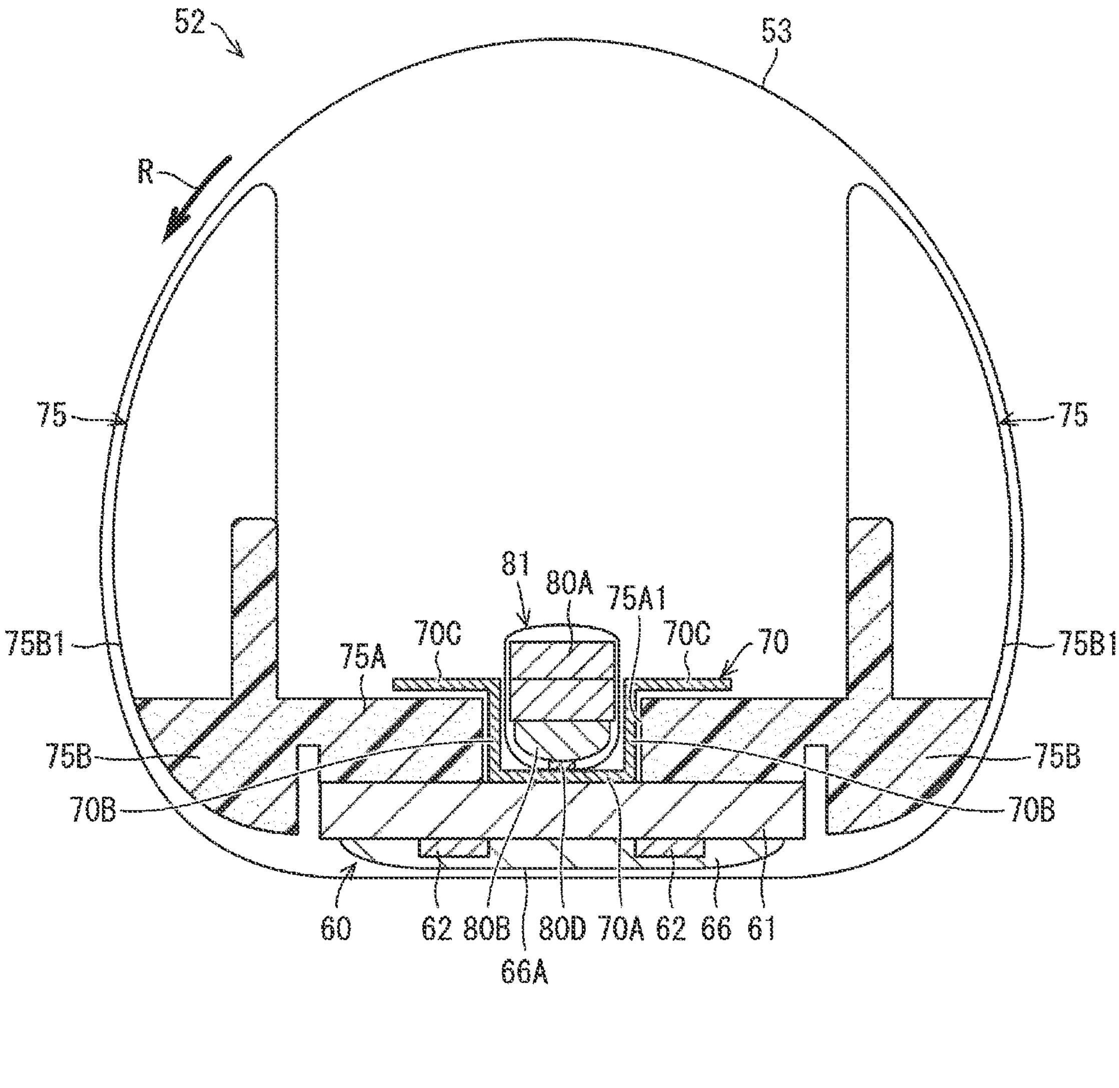
FIG. 5 is a cross-sectional view showing the first temperature sensor and the metal sheet of the heating unit.
Figure 6:
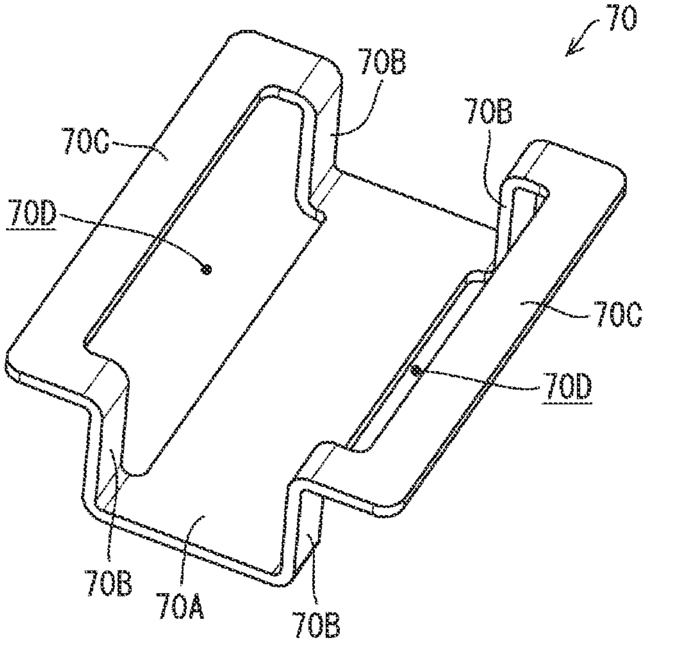
FIG. 6 is a perspective view showing a specific configuration example of the metal sheet.
Figure 7:
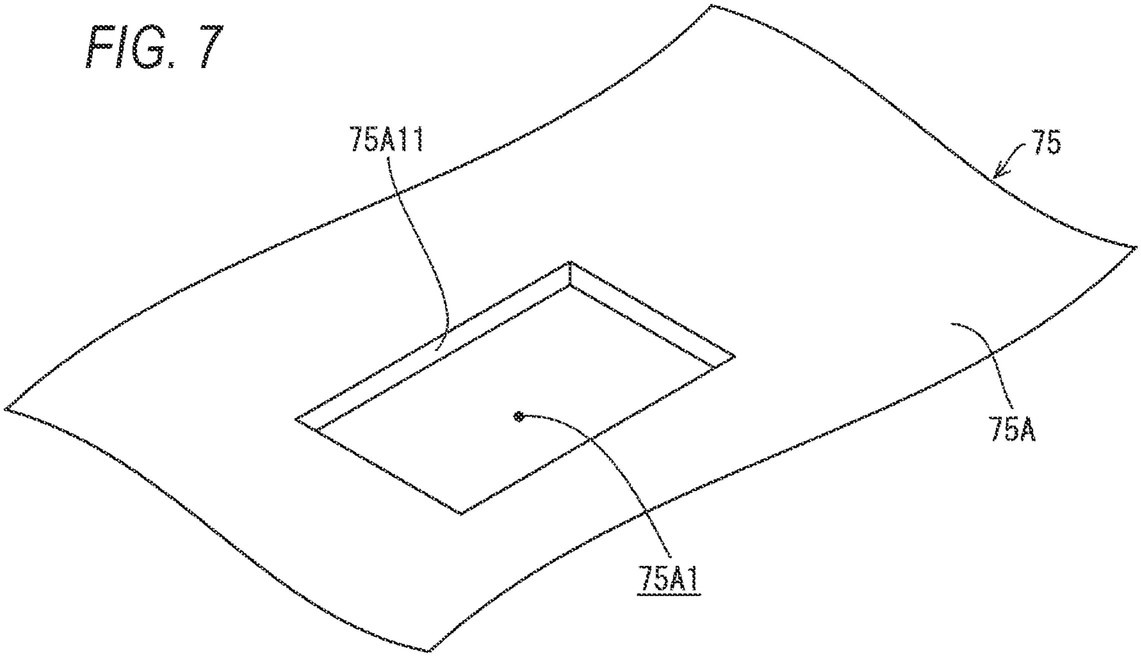
FIG. 7 is a perspective view illustrating a hole formed in the holder and a wall surrounding the hole.
Figure 8:
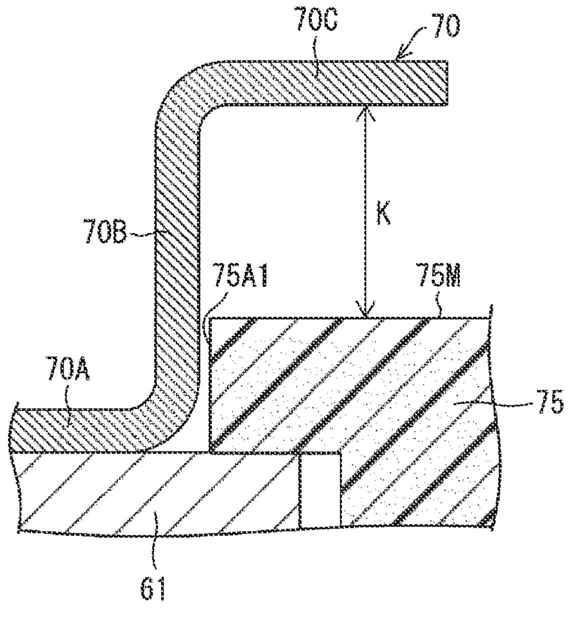
FIG. 8 is a view illustrating a relationship between the metal sheet and the holder.
Figure 9:
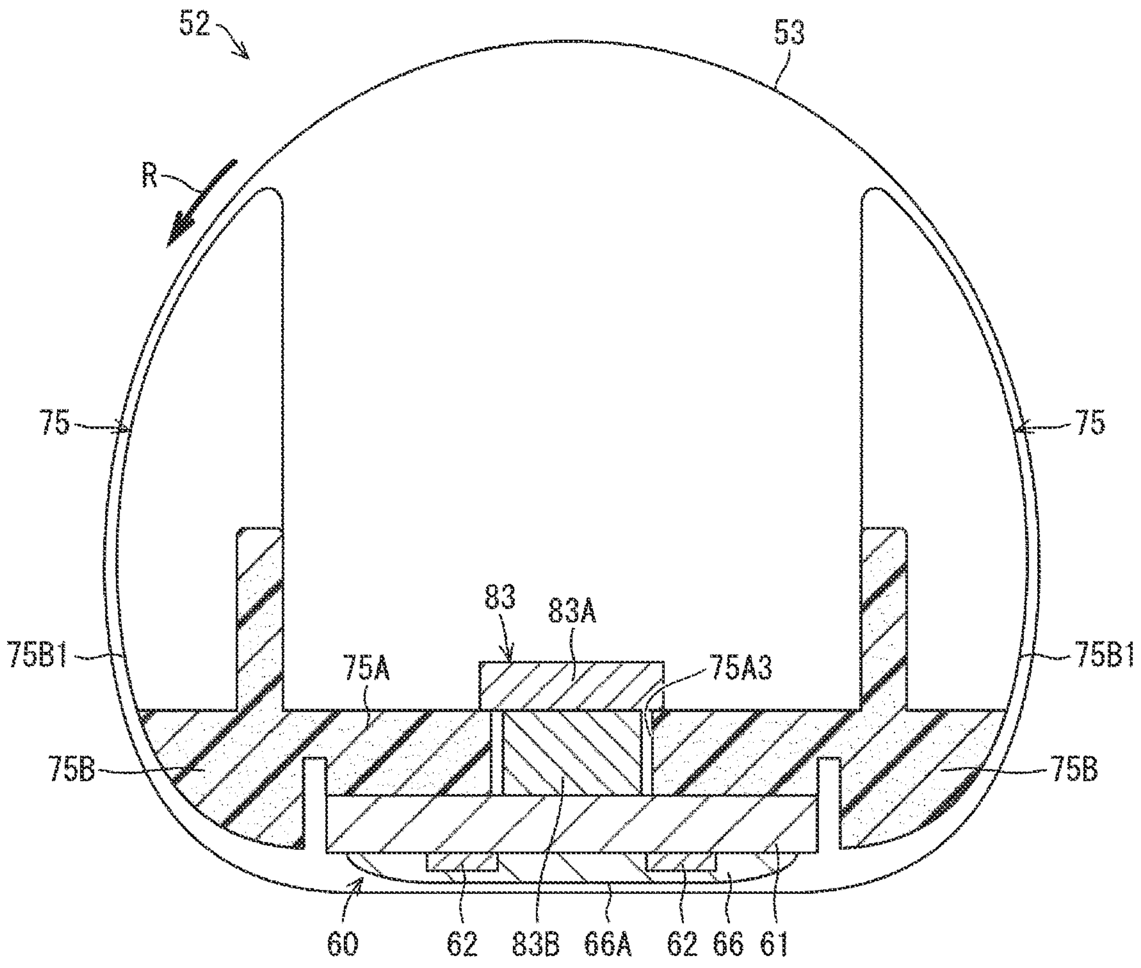
FIG. 9 is a cross-sectional view showing the power supply cutoff member of the heating unit.

Here, the heating unit 52 of the present embodiment will be specifically described with reference to FIGS. 2 to 9. (A) of FIG. 2 is a plan view showing the heater 60 of the heating unit 52 included in the fixing unit 45 according to the first embodiment of the present disclosure, and (B) of FIG. 2 is a plan view showing a first temperature sensor 81, a second temperature sensor 82, and a power supply cutoff member 83 of the heating unit 52. (A) of FIG. 3 is a perspective view showing the first temperature sensor 81 and the second temperature sensor 82, and (B) of FIG. 3 is a perspective view showing the power supply cutoff member 83. FIG. 4 is a schematic view illustrating a relationship between a metal sheet 70 and a temperature sensor 80 in a holder 75 shown in FIG. 2. The temperature sensor 80 indicates the first temperature sensor 81 and the second temperature sensor 82. FIG. 5 is a cross-sectional view showing the first temperature sensor 81 and the metal sheet 70 of the heating unit 52. FIG. 6 is a perspective view showing a specific configuration example of the metal sheet 70. FIG. 7 is a perspective view illustrating a hole 75A1 formed in the holder 75 and a wall 75A11 surrounding the hole 75A1. FIG. 8 is a view illustrating a relationship between the metal sheet 70 and the holder 75. FIG. 9 is a cross-sectional view showing the power supply cutoff member 83 of the heating unit 52.

[Configuration of Heater 60]

As shown in (A) of FIG. 2 and (B) of FIG. 2, the heating unit 52 of the present embodiment includes the heater 60 and the holder 75 that holds the heater 60. The heater 60 is a heating member formed in a rectangular shape in a plan view, and includes a substrate 61 and, for example, two resistance heating elements 62 disposed on the substrate 61.

The substrate 61 is formed of, for example, a ceramic material, and the two resistance heating elements 62 are formed on one surface of the substrate 61 by, for example, printing patterning, so as to be parallel to each other. Alternatively to the above description, the substrate 61 may be also formed of, for example, a metal material such as stainless steel. In this case, the two resistance heating elements 62 are formed on the one surface of the substrate 61 with an insulating layer made of a glass material or the like interposed therebetween.

Each of the resistance heating elements 62 is formed of, for example, a conductive material having excellent heat generation properties such as a nickel-chromium alloy or an iron-chromium alloy. A power supply terminal 63 is connected to one end 62A of the resistance heating element 62 via a conducting wire 64. A conducting wire 65 is connected to the other end 62B of the resistance heating element 62, and the two resistance heating elements 62 are electrically conducted with each other via the conducting wire 65.

A connector (not shown) is connected to the power supply terminal 63 so as to be attachable and detachable, and a power source (not shown) is connected to the power supply terminal 63 through the connector, so that power supply is performed. In the heater 60, the resistance heating elements 62 generate heat in accordance with an instruction from the controller. That is, heat from the heater 60 to the belt 53 is controlled by controlling a current supplied to the resistance heating elements 62, and further increasing or decreasing the heat generated by the resistance heating elements 62.

As shown in (A) of FIG. 2, in the heater 60, a dimension of each of the resistance heating elements 62 in a longitudinal direction is a dimension larger than that of the sheet S1 having a maximum width H1 that may be used in the fixing unit 45. The fixing unit 45 is configured such that a plurality of types of sheets S1 having different width dimensions may be handled. Specifically, in the fixing unit 45, a fixing operation is performed in a state where centers, in a width direction, of the sheets S1 having a plurality of sheet sizes coincide with each other. For example, the sheet S1 having a minimum width H2 that may be used in the fixing unit 45 is heated by a central portion of the resistance heating elements 62, so that the fixing operation is performed.

In the fixing unit 45, when the fixing operation is performed on the sheet S1 having the minimum width H2, end portion regions H3 and H4 outside the minimum width H2 in the longitudinal direction are non-sheet passing regions where the sheet S1 having the minimum width H2 is not present. Therefore, in the end portion regions H3 and H4, heat is not taken away by the sheet S1 having the minimum width H2 during the fixing operation, and a temperature of the heater 60 rises more easily than the central portion of the resistance heating elements 62, that is, a region of the minimum width H2.

As shown in FIG. 5, the heater 60 includes a cover 66 provided on the substrate 61 so as to cover the resistance heating elements 62. The cover 66 is formed of, for example, an insulating material such as a glass material. The cover 66 includes a nip surface 66A that is in contact with an inner peripheral surface of the belt 53.

[Configuration of Belt 53]

The belt 53 is an endless belt having heat resistance and flexibility, and includes, for example, a base that is made of a metal material such as stainless steel, and an insulating layer that is made of a synthetic resin material such as a fluororesin and covers the base (not shown). The belt 53 accommodates therein the heater 60, the metal sheet 70, the holder 75, the first temperature sensor 81, the second temperature sensor 82, and the power supply cutoff member 83. The belt 53 rotates about the heater 60, the metal sheet 70, the holder 75, the first temperature sensor 81, the second temperature sensor 82, and the power supply cutoff member 83.

Furthermore, the inner peripheral surface of the belt 53 is in contact with the nip surface 66A of the heater 60, and heat from the heater 60 is transferred to the sheet S1 via the belt 53. A dimension of the belt 53 in the longitudinal direction is larger than the dimension of each of the resistance heating elements 62.

[Configuration of Holder 75]

The holder 75 is formed of, for example, a synthetic resin material. As shown in (B) of FIG. 2, the holder 75 includes a support portion 75A that supports the heater 60. That is, the support portion 75A supports the substrate 61 of the heater 60 indicated by a dotted line in (B) of FIG. 2. As shown in FIG. 5, the holder 75 includes a guide surface 75B1 that is in contact with the inner peripheral surface of the belt 53, and includes a guide portion 75B that guides the belt 53.

The holder 75 is formed with holes 75A1, 75A2, and 75A3 in which the first temperature sensor 81, the second temperature sensor 82, and the power supply cutoff member 83 are respectively provided. The holes 75A1, 75A2, and 75A3 are formed by opening the support portion 75A of the holder 75 in a rectangular shape, and a periphery of the hole 75A1 is surrounded by the wall 75A11 as illustrated in FIG. 7. The wall 75A11 has, in an up and down direction in FIG. 5, a thickness corresponding to a thickness of the support portion 75A. The metal sheets 70 are respectively inserted into the holes 75A1 and 75A2, and each of the first temperature sensor 81 and the second temperature sensor 82 is in contact with a corresponding one of the metal sheets 70 through a corresponding one of the holes 75A1 and 75A2.

[Configurations of First Temperature Sensor 81 and Second Temperature Sensor 82]

Each of the first temperature sensor 81 and the second temperature sensor 82 is implemented by, for example, a thermistor. The first temperature sensor 81 and the second temperature sensor 82 are collectively referred to as the temperature sensor 80.

As shown in (A) of FIG. 3, the temperature sensor 80 includes: a base 80A; a protruding member 80B on which a temperature detection element 80D is provided and from which the temperature detection element 80D protrudes upward; and a film member 80C provided on the base 80A so as to cover the protruding member 80B. The protruding member 80B is formed of, for example, an elastic material such as a sponge material, and is attached to the base 80A. In the temperature sensor 80, the temperature detection element 80D is pressed by the protruding member 80B, so that the temperature detection element 80D may be reliably brought into contact with a temperature detection target so as to perform temperature detection with high accuracy.

As shown in FIG. 4, in a state where the base 80A is in contact with the support portion 75A, the temperature sensor 80 is attached to the hole 75A1 of the holder 75 with the metal sheet 70 interposed between the temperature sensor 80 and the holder 75.

As shown in (B) of FIG. 2, the first temperature sensor 81 is provided in the holder 75 so as to be located at a position within a range of the minimum width H2, and detects a temperature of a central portion of the heater 60 in the longitudinal direction. Specifically, in the first temperature sensor 81, as shown in FIG. 5, the protruding member 80B is inserted through the hole 75A1 of the holder 75, and the temperature detection element 80D is brought into contact with a back surface of the substrate 61 with a central portion 70A of the metal sheet 70 interposed therebetween, so that the temperature of the central portion in the longitudinal direction is detected. The first temperature sensor 81 is connected to the controller, and the controller performs feedback control of the heater 60 by using a detection result of the first temperature sensor 81.

As shown in (B) of FIG. 2, the second temperature sensor 82 is provided in the holder 75 so as to be located at a position within a range of the end portion region H3 and at a position of an end portion of the resistance heating element 62 in the longitudinal direction, and detects a temperature on an end portion side in the longitudinal direction with respect to the first temperature sensor 81. Specifically, in the second temperature sensor 82, similarly to the first temperature sensor 81, the protruding member 80B is inserted through the hole 75A2 of the holder 75. In the second temperature sensor 82, the temperature detection element 80D is brought into contact with the back surface of the substrate 61 with the central portion 70A of the metal sheet 70 interposed therebetween, so that the temperature of the end portion in the longitudinal direction is detected. The second temperature sensor 82 is connected to the controller, and the controller determines, using a detection result of the second temperature sensor 82, a degree of temperature rise at the end portion in the longitudinal direction.

[Configuration of Power supply Cutoff Member 83]

The power supply cutoff member 83 cuts off power supply to the resistance heating elements 62 when the heater 60 abnormally rises in temperature. Specifically, the power supply cutoff member 83 is implemented by, for example, a thermostat, and includes a container 83A and a temperature detection unit 83B that protrudes upward from the container 83A and detects a temperature, as shown in (B) of FIG. 3. The container 83A is connected to the temperature detection unit 83B, and is provided therein with, for example, a cutoff mechanism (not shown) using a bimetal. When the temperature of the heater 60 rises to a given temperature or higher, the power supply cutoff member 83 cuts off the power supply, that is, power supply to the resistance heating elements 62. The power supply cutoff member 83 is not limited to the thermostat, and may be, for example, a thermal fuse or the like.

As shown in (B) of FIG. 2, the power supply cutoff member 83 is provided in the holder 75 so as to be located at a position within a range of the end portion region H4, and detects a temperature on one end portion side of the heater 60 in the longitudinal direction. Specifically, in the power supply cutoff member 83, as shown in FIG. 9, the temperature detection unit 83B is inserted through the hole 75A3 of the holder 75 and the temperature detection unit 83B is in contact with the back surface of the substrate 61, so that the temperature on the one end portion side is detected.

[Configuration of Metal Sheets 70]

The metal sheets 70 are each formed of, for example, a metal material having a high thermal conductivity, such as aluminum, phosphor bronze, stainless steel, or titanium. A corresponding one of the metal sheets 70 is inserted into the hole 75A1 or 75A2, so that the metal sheet 70 is provided in the holder 75 so as to be positioned with respect to the heater 60. The metal sheets 70 have a function of reducing occurrence of displacement in relative positions of the first temperature sensor 81 and the second temperature sensor 82 with respect to the heater 60 as much as possible. Furthermore, each of the metal sheets 70 has a function of equalizing heat of the heater 60 within a range of the metal sheet 70. Each metal sheet 70 may have a sheet shape or a plate shape.

Specifically, the metal material, which is larger in thermal conductivity than the substrate 61, is used for each of the metal sheets 70. As a result, in the present embodiment, each of the metal sheets 70 may easily equalize the heat of the heater 60 from the substrate 61. As a result, in the present embodiment, it is possible to improve accuracy of temperature detection performed by each of the first temperature sensor 81 and the second temperature sensor 82 that are respectively in contact with the metal sheets 70.

Since each of the metal sheets 70 is formed of aluminum, phosphor bronze, stainless steel, or titanium, the metal sheet 70 may reliably equalize the heat of the heater 60 from the substrate 61. As a result, each of the metal sheets 70 may reliably improve the accuracy of temperature detection performed by a corresponding one of the first temperature sensor 81 and the second temperature sensor 82 that are respectively in contact with the metal sheets 70.

As shown in FIG. 6, the metal sheet 70 includes the central portion 70A having a rectangular shape. The metal sheet 70 is attached to the holder 75 such that a longitudinal direction and a lateral direction of the central portion 70A coincide with the longitudinal direction and a lateral direction of the heater 60 (and the substrate 61), respectively. Here, the lateral direction is a direction orthogonal to the longitudinal direction. The metal sheet 70 includes: a pair of first extending portions 70B that extend, in an orthogonal direction that are orthogonal to the longitudinal direction and the lateral direction of the substrate 61, respectively from both end portions of the central portion 70A in the lateral direction; and a pair of second extending portions 70C that extend, in the lateral direction, respectively from end portions of the pair of first extending portions 70B. The orthogonal direction is not limited to a direction orthogonal to the longitudinal direction and the lateral direction and may be a given direction as long as the given direction crosses the longitudinal direction and the lateral direction. For example, an angle between the given direction and the direction orthogonal to the longitudinal direction and the lateral direction may be 5 degrees, wherein the given direction crosses a plane parallel to the longitudinal direction and the lateral direction.

As shown in FIG. 5, the central portion 70A is in contact with the back surface of the substrate 61 and the temperature detection element 80D. A contact area between the metal sheet 70 and the substrate 61, that is, a contact area between the central portion 70A and the substrate 61 is smaller than a contact area between the substrate 61 and the holder 75. As a result, in the present embodiment, a thermal capacity of the metal sheet 70 may be reliably reduced. As described above, in the present embodiment, the metal sheet 70 is provided for each of the first temperature sensor 81 and the second temperature sensor 82.

Therefore, in the present embodiment, as compared with a case where a metal sheet is provided on an entire surface of the substrate 61, the heat generated by the heater 60 may be significantly reduced from being absorbed by the metal sheet 70, and the temperature of the heater 60 may be increased promptly. Therefore, in the image forming apparatus 1 according to the present embodiment, the fixing unit 45 may be quickly started up, and an image forming process (printing process) may be performed at a high speed.

The first extending portions 70B constitute both end portions of the metal sheet 70 in the lateral direction, and are bent toward an intersecting direction (that is, the orthogonal direction and the up and down direction in FIG. 5) intersecting with the substrate 61. As a result, in the present embodiment, the metal sheet 70 to be inserted into the hole 75A1 or 75A2 may be easily formed.

With reference to FIGS. 5 to 7, an end surface of each of the first extending portions 70B in the lateral direction is configured to be restricted by the wall 75A11 surrounding the hole 75A1. As at least one end surface of the first extending portions 70B in the lateral direction is in contact with the wall 75A11, when the metal sheet 70 is attached to the holder 75, the metal sheet 70 is positioned in the lateral direction of the heater 60. As a result, in the present embodiment, the metal sheet 70 may be reliably positioned in the lateral direction of the heater 60. Positioning of the metal sheet 70 in the lateral direction of the heater 60 may be performed by using the end surface, in the lateral direction, of any one first extending portion 70B among the both end portions of the metal sheet 70 in the lateral direction.

With reference to FIG. 4 and FIGS. 6 to 7, an end surface of the first extending portion 70B in the longitudinal direction is configured to be restricted by the wall 75A11 surrounding the hole 75A1. As a result, when the metal sheet 70 is attached to the holder 75, the end surface of the first extending portion 70B in the longitudinal direction is in contact with the wall 75A11, so that the metal sheet 70 is positioned in the longitudinal direction of the heater 60. As a result, in the present embodiment, the metal sheet 70 may be reliably positioned in the longitudinal direction of the heater 60. Positioning of the metal sheet 70 in the longitudinal direction of the heater 60 may be performed by using the end surface, in the longitudinal direction, of any one first extending portion 70B among both end portions of the metal sheet 70 in the longitudinal direction.

With reference to FIGS. 5 to 6 and FIG. 8, each of the second extending portions 70C constitutes an end portion of the metal sheet 70 in the lateral direction. The second extending portion 70C is bent toward an outside of the hole 75A1 or 75A2 in a direction intersecting with the orthogonal direction so as to be parallel to a surface 75M of the support portion 75A. As described above, in the metal sheet 70, the second extending portion 70C is bent toward the outside of the hole 75A1 or 75A2, so that a strength of the metal sheet 70 may be reliably increased in the present embodiment.

The second extending portion 70C protrudes from the hole 75A1 or 75A2 on a side opposite to the substrate 61 so as to be higher than the wall 75A11. That is, as shown in FIG. 8, the metal sheet 70 is attached to the holder 75 in a state where a surface of the second extending portion 70C on a substrate 61 side and the surface 75M of the holder 75 are separated from each other by a distance K. As a result, in the present embodiment, it is possible to easily assemble the metal sheet 70 to the holder 75 while increasing the strength of the metal sheet 70.

Furthermore, with reference to FIGS. 4 and 6, a portion of the metal sheet 70 inserted into the hole 75A1 or 75A2 is formed with an opening portion 70D at a central portion in the longitudinal direction of the heater 60. That is, in the metal sheet 70, the opening portion 70D having a substantially rectangular parallelepiped shape is formed so as to be surrounded by the central portion 70A, a pair of first extending portions 70B facing each other in the longitudinal direction, and the second extending portion 70C. As a result, in the present embodiment, it is possible to easily improve positioning accuracy of the metal sheet 70 by the pair of first extending portions 70B while reducing the thermal capacity of the metal sheet 70. Therefore, in the image forming apparatus 1 according to the present embodiment, as compared with a case where no opening portion 70D is provided in the metal sheet 70, the fixing unit 45 may be more quickly started up, and the image forming process (printing process) may be performed at a higher speed.

As described above, each of the fixing unit 45 and the image forming apparatus 1 according to the present embodiment includes: the heater 60 including the resistance heating elements 62 disposed on the substrate 61; and the holder 75 that is formed with the hole 75A1 and holds the heater 60. Each of the fixing unit 45 and the image forming apparatus 1 includes the metal sheet 70 in contact with the substrate 61, and the temperature sensor 80 that detects the temperature of the heater 60. The temperature sensor 80 is in contact with the metal sheet 70 through the hole 75A1. In the lateral direction of the substrate 61, the first extending portions 70B (end portions in the lateral direction) of the metal sheet 70 are inserted into the hole 75A1, so that the metal sheet 70 is positioned with respect to the heater 60. As described above, in the fixing unit 45 and the image forming apparatus 1 according to the present embodiment, the metal sheet 70 is positioned with respect to the heater 60, so that a positional deviation of the metal sheet 70 with respect to the temperature sensor 80 may be reduced.

Therefore, in the fixing unit 45 and the image forming apparatus 1 according to the present embodiment, unlike the above example in the related art, occurrence of displacement in relative position of the temperature sensor 80 with respect to the heater 60 may be reduced as much as possible, and the temperature detection performed by the temperature sensor 80 may be stable. As a result, in the fixing unit 45 and the image forming apparatus 1 according to the present embodiment, it is possible to reduce a decrease in accuracy of detection of a fixing temperature performed by the temperature sensor 80, and furthermore, it is possible to appropriately control the temperature of the heater 60 and reduce occurrence of image quality deterioration in the image forming process.

In the fixing unit 45 and the image forming apparatus 1 according to the present embodiment, the temperature sensor 80 includes: the first temperature sensor 81 that detects the temperature of the central portion of the heater 60 in the longitudinal direction; and the second temperature sensor 82 that detects the temperature on the end portion side in the longitudinal direction with respect to the first temperature sensor 81. The two metal sheets 70 are disposed correspondingly to the first temperature sensor 81 and the second temperature sensor 82, respectively. As a result, in the fixing unit 45 and the image forming apparatus 1 according to the present embodiment, the temperature detection performed by each of the first temperature sensor 81 and the second temperature sensor 82 may be stable.

In the fixing unit 45 and the image forming apparatus 1 according to the present embodiment, the power supply cutoff member 83 is disposed on the one end portion side of the heater 60 in the longitudinal direction, so that the power supply cutoff member 83 may detect the temperature on the end portion side in the width direction of the sheet S1. As a result, in the fixing unit 45 and the image forming apparatus 1 according to the present embodiment, responsiveness to the temperature of the heater 60 may be ensured by the power supply cutoff member 83, and the power supply to the resistance heating elements 62 may be cut off when the heater 60 abnormally rises in temperature.

Second Embodiment

Another embodiment of the present disclosure will be described below. For convenience of description, members having the same functions as those described in the above embodiment are denoted by the same reference numerals, and descriptions thereof will not be repeated.

(A) of FIG. 10 is a plan view showing the heater 60 of the heating unit 52 included in the fixing unit 45 according to a second embodiment of the present disclosure, and (B) of FIG. 10 is a plan view showing the first temperature sensor 81, the second temperature sensor 82, and the power supply cutoff member 83 of the heating unit 52. FIG. 11 is a cross-sectional view showing the first temperature sensor 81 and the metal sheet 70 of the heating unit 52.

In the drawings, a difference between the second embodiment and the first embodiment is that in the metal sheet 70, second extending portions 70E (end portions in the lateral direction) are each bent toward the outside of the hole 75A1 or 75A2 and toward a direction away from the substrate 61, that is, bent obliquely upward. Another difference between the second embodiment and the first embodiment is that the power supply cutoff member 83 is disposed within a range through which the sheet S1 having the minimum width H2 may pass.

As shown in (A) of FIG. 10 and (B) of FIG. 10, in the heating unit 52 of the second embodiment, the power supply cutoff member 83 is disposed within the range through which the sheet S1 having the minimum width H2 may pass. That is, similarly to the first temperature sensor 81, the power supply cutoff member 83 detects the temperature of the central portion in the longitudinal direction.

As shown in FIG. 11, the metal sheet 70 of the second embodiment is provided with the second extending portions 70E instead of the second extending portions 70C shown in FIG. 6. The second extending portions 70E respectively constitute the end portions of the metal sheet 70 in the lateral direction, and are each bent toward the outside of the hole 75A1 or 75A2 and toward the direction away from the substrate 61. That is, similarly to the second extending portions 70C, the second extending portions 70E are provided continuously with the first extending portions 70B, respectively. Unlike the second extending portions 70C, the second extending portions 70E are each bent, at a given angle greater than 0 degree, with respect to the surface 75M (FIG. 8) of the support portion 75A.

With the above configuration, the second embodiment achieves the same effects as those of the first embodiment. In the second embodiment, the power supply cutoff member 83 is disposed within the range through which the sheet S1 having the minimum width H2 may pass. As a result, in the second embodiment, the power supply cutoff member 83 may cut off the power supply to the resistance heating elements 62 when the heater 60 abnormally rises in temperature regardless of a size of the sheet S1 in the width direction.

In the second embodiment, the metal sheet 70 is provided with the second extending portions 70E that are each bent obliquely upward outside the hole 75A1 or 75A2. As a result, in the second embodiment, it is possible to easily assemble the metal sheet 70 to the holder 75.

Although the configuration using the metal sheet 70 has been described in the above description, the present disclosure is not limited at all as long as a sheet is in contact with the temperature sensor 80, and the sheet may be a sheet made of another material.

The present disclosure is not limited to the embodiments described above, and various modifications may be made within the scope of the claims. Embodiments obtained by appropriately combining technical means disclosed in the embodiments are also included in the technical scope of the present disclosure.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A fixing unit comprising:

a heater including a substrate and a resistance heating element disposed on the substrate;

an endless belt configured to move about the heater and having an inner peripheral surface in contact with the heater, and;

a holder holding the heater and having a hole;

a metal sheet in contact with the substrate; and a temperature sensor configured to detect a temperature of the heater, wherein the temperature sensor is in contact with the metal sheet and disposed inside the hole, wherein the metal sheet is inserted into the hole so that the metal sheet is positioned with respect to the heater in a lateral direction of the heater which is orthogonal to a longitudinal direction of the heater, wherein the holder includes a wall which defines the hole, and wherein an end surface of the metal sheet in the longitudinal direction of the heater is in contact with the wall so that the metal sheet is positioned in the longitudinal direction.

2. The fixing unit according to claim 1, wherein each end portion of the metal sheet in the lateral direction are bent toward a direction intersecting with the substrate.

3. The fixing unit according to claim 2, wherein the metal sheet includes:

a central portion in contact with the substrate;

a pair of first extending portions that extend in an orthogonal direction which is orthogonal to the longitudinal direction and the lateral direction of the heater, each of the first extending portions extending from corresponding one of end portions of the central portion in the lateral direction; and a pair of second extending portions that extend in the lateral direction, each of the second extending portions extending from corresponding one of end portions of the pair of first extending portions.

4. The fixing unit according to claim 1, wherein a portion of the metal sheet inserted into the hole is formed with an opening at a central portion of the metal sheet in the longitudinal direction of the heater.

5. The fixing unit according to claim 1, wherein an end portion of the metal sheet in the lateral direction protrudes from the hole at a side opposite to the substrate.

6. The fixing unit according to claim 5, wherein the end portion of the metal sheet in the lateral direction is bent toward an outside of the hole.

7. The fixing unit according to claim 6, wherein the end portion of the metal sheet in the lateral direction is bent toward the outside of the hole and along a direction away from the substrate.

8. The fixing unit according to claim 1, wherein a contact area between the substrate and the metal sheet is smaller than a contact area between the substrate and the holder.

9. The fixing unit according to claim 1, wherein a thermal conductivity of the metal sheet is larger than a thermal conductivity of the substrate.

10. The fixing unit according to claim 1, wherein the metal sheet is formed of aluminum, phosphor bronze, stainless steel, or titanium.

11. The fixing unit according to claim 1,
wherein the temperature sensor includes:
a first temperature sensor configured to detect a temperature of a central portion of the heater in the longitudinal direction of the heater; and
a second temperature sensor configured to detect a temperature on an end portion of the heater, the end portion being closer to an edge of the heater in the longitudinal direction than the central portion at the same side in the longitudinal direction, and
wherein the metal sheet includes:
a first metal sheet disposed on the first temperature sensor; and
a second metal sheet disposed on the second temperature sensor.

12. The fixing unit according to claim 1,
wherein the temperature sensor includes:
a first temperature sensor configured to detect a temperature in a first region corresponding to a first sheet having a minimum width acceptable to the fixing unit; and
a second temperature sensor configured to detect a temperature in a second region being outside the first region and corresponding to a second sheet having a maximum width acceptable to the fixing unit, and
wherein the metal sheet includes:
a first metal sheet disposed on the first temperature sensor; and
a second metal sheet disposed on the second temperature sensor.

13. The fixing unit according to claim 1, further comprising:
a thermostat configured to cut off power supply to the resistance heating element in a case where temperature of the heater reaches a threshold,
wherein the thermostat is in contact with a surface of the substrate on a side opposite to a surface of the substrate with which the belt is in contact.

14. The fixing unit according to claim 13,
wherein the thermostat is disposed at a central portion of the heater in the longitudinal direction of the heater.

15. A fixing unit comprising:
a heater including a substrate and a resistance heating element disposed on the substrate;
an endless belt configured to move about the heater and having an inner peripheral surface in contact with the heater;
a holder holding the heater and including a wall which defines a hole;
a metal sheet including:
a central portion in contact with the substrate; and
a pair of first extending portions that extend in an orthogonal direction which crosses a longitudinal direction and a lateral direction of the heater, the lateral direction being orthogonal to the longitudinal direction of the heater, each of the first extending portions extending from corresponding one of end portions of the central portion in the lateral direction; and
a temperature sensor configured to detect a temperature of the heater,
wherein the temperature sensor is in contact with the central portion of the metal sheet and disposed inside the hole,
wherein at least one of the first extending portions is in contact with, in the lateral direction, the wall when the metal sheet is inserted into the hole,
wherein the holder includes a wall which defines the hole, and
wherein an end surface of the metal sheet in the longitudinal direction of the heater is in contact with the wall so that the metal sheet is positioned in the longitudinal direction.

16. A fixing unit comprising:
a heater including a substrate and a resistance heating element disposed on the substrate;
an endless belt configured to move about the heater and having an inner peripheral surface in contact with the heater, and;
a holder holding the heater and having a hole;
a metal sheet in contact with the substrate; and
a temperature sensor configured to detect a temperature of the heater,
wherein the temperature sensor is in contact with the metal sheet and disposed inside the hole,
wherein the metal sheet is inserted into the hole so that the metal sheet is positioned with respect to the heater in a lateral direction of the heater which is orthogonal to a longitudinal direction of the heater,
wherein an end portion of the metal sheet in the lateral direction protrudes from the hole at a side opposite to the substrate, and
wherein the end portion of the metal sheet in the lateral direction is bent toward an outside of the hole.

* * * * *